United States Patent [19]
Radosta

[11] Patent Number: 5,866,646
[45] Date of Patent: Feb. 2, 1999

[54] POLYOLEFIN FILM, COMPOSITIONS AND RESINS USEABLE THEREFOR AND RELATED MAKING METHOD

[76] Inventor: Joseph A. Radosta, 3 Wedgewood Dr., Easton, Pa. 18045

[21] Appl. No.: 934,761

[22] Filed: Sep. 22, 1997

Related U.S. Application Data

[63] Continuation of Ser. No. 636,364, Apr. 23, 1996, abandoned.

[51] Int. Cl.$^6$ .............................. C08K 3/34; C09K 15/32
[52] U.S. Cl. ........................ 524/451; 524/449; 252/400.3
[58] Field of Search ........................ 252/400.3; 524/449, 524/451

[56] References Cited

U.S. PATENT DOCUMENTS

| | | | |
|---|---|---|---|
| 4,187,210 | 2/1980 | Howard, Jr. ............................. | 523/220 |
| 5,346,944 | 9/1994 | Hayashida ............................... | 524/451 |

FOREIGN PATENT DOCUMENTS 6049047 of 1985 Japan .

OTHER PUBLICATIONS

Abstract, Japanese Patent No. J 02163143, Idemitsu Petrochem Company.

The New Encyclopedia Britannica, vol. 24, pp. 151–157, 175–179 (Chicago, 1986).

Einhehner Abrasion Tester Model AT 1000, Duncan Associates, 85 Field Ave., Rutland, VT.

*Primary Examiner*—Kriellion S. Morgan
*Attorney, Agent, or Firm*—Marvin J. Powell; Terry B. Morris

[57] ABSTRACT

This invention concerns a mixture of a first component selected from talcs and a second component selected from feldspars and nepheline syenites, wherein the ratio of the first component to the second component provides an enhanced abrasiveness property. The invention further relates to an antiblock agent made from such mixture. This mixture provides favorable optical properties when used in a polyolefin film. This invention also relates to a polyolefin resin composition having the mixture therein, as well as to films made with such.

19 Claims, No Drawings

POLYOLEFIN FILM, COMPOSITIONS AND RESINS USEABLE THEREFOR AND RELATED MAKING METHOD

This is a continuation of application Ser. No. 08/636,364, filed Apr. 23, 1996 now abandoned.

FIELD OF INVENTION

This invention relates to polyolefin resin compositions, precursor materials used therein and films made therefrom.

More particularly, the invention relates to the use of a combination of talc and feldspar, or nepheline syenite.

BACKGROUND

The invention pertains to polyolefin resin compositions that are designed to produce clear films that have satisfactory antiblocking capability and where the antiblocking agent exhibits low abrasivity. These films would be used in a broad range of packaging and covering film applications.

Polyolefin films are used extensively for packaging around the world and, increasingly, are replacing traditional materials such as paper. High clarity polyolefin films allow easy viewing and identification of the package contents. When plastic film is produced, however, there is a tendency for two or more contacting layers of the film to stick together, or "block", making separation of the film, opening the bag, or finding the end of the roll difficult.

Addition of inorganic mineral fillers to polyolefin film to reduce blocking is required commercially. It is well recognized that films produced from resin containing antiblock fillers have a rougher surface, which reduces the intimate contact between layers of film and reduces blocking, hence, the term "antiblocking agent" is applied to such fillers.

Not all inorganic fillers are effective antiblocks and some effective antiblocks have other problems (such as high cost, high abrasivity, adverse affect on opticals, health hazard) which limit their commercial utility. The objective is to add as little antiblock as possible to reduce blocking force to the required level, while minimizing the adverse effects on optical properties of the film and other concerns such as wear on processing equipment.

Diatomaceous earth has been widely used as a moderately effective antiblocking agent but has the following adverse attributes: fair film haze, poor film clarity, very high abrasiveness, and is moderately expensive. Talc is also widely used in certain polyolefin formulations as a moderately effective antiblocking agent. Its advantages over diatomaceous earth are lower cost, excellent film clarity, and very low abrasiveness. However, its film haze is usually only fair and would not be suitable for high clarity packaging applications. While nepheline syenite or feldspar have been considered as antiblocking agents for high clarity film applications (because their optical index of refraction is closer to that of polyethylene), they are relatively ineffective in reducing blocking forces, and have very high abrasiveness.

Abrasivity of inorganic antiblocks is of concern for several reasons. Highly abrasive antiblocks will contribute to rapid equipment wear in compounding and processing equipment. When wear reaches the point where it changes the equipment dimensions in critical areas, both dispersion of additives in the resin and output rates can be adversely affected. In such cases, product quality may suffer and production costs may increase, particularly if the equipment must be taken out of service and new parts purchased to replace worn pieces of equipment. In addition, abrasion of equipment will introduce metal contamination into the plastic product, which may have a detrimental effect on product stability or color or both. Antiblocks with low abrasiveness are preferred for these reasons.

There have been many attempts by others to solve the problem of balancing polyolefin film antiblocking and haze properties but none have addressed the additional concerns of film clarity and the antiblock abrasivity and cost (which are all necessary considerations for a viable commercial product). The existing situation is that a cost effective antiblocking formulation for high clarity polyolefin films with low abrasivity of the antiblock has not yet been found.

SUMMARY OF THE INVENTION

The present invention concerns a mixture of a first component selected from talcs and a second component selected from feldspars and nepheline syenites, wherein the ratio of the first component to the second component provides an abrasiveness property significantly less than that expected from the law of mixtures. The invention further relates to an antiblock agent comprising a mixture of a first component selected from talcs and a second component selected from feldspars and nepheline syenites, wherein the ratio of the first component to the second component provides an antiblocking action significantly greater than either component alone. This agent does not result in a significant loss of optical properties when used in a polyolefin film.

This invention also relates to a mixture of a first component selected from talcs and a second component selected from feldspars and nepheline syenites, wherein the ratio of the first component to the second component provides an abrasiveness property significantly less than that expected from the law of mixtures and wherein the ratio of the first component to the second component provides an antiblocking action significantly greater than either component alone.

This invention also relates to a polyolefin resin composition wherein the ratio of the first component to the second component further provides an antiblocking action significantly greater than either component alone, and the abrasiveness property of the first and second component in mixture is about eighty percent or less than that expected from the law of mixtures.

Also this invention relates to a polyolefin film comprising the polyolefin resin composition, and such film can be made from the above components having an abrasiveness property significantly less than that expected from the law of mixtures, and the film can have an antiblocking action significantly greater than when made from either component alone.

An advantage of the present invention is that the mixtures and polyolefin resin compositions can be used to produce films that have satisfactory antiblocking and optical properties (haziness and clarity). The precursor mixtures also can have low abrasivity. The combination produces a synergistic effect wherein the degree of antiblocking action is unexpectedly higher than either alone, while still retaining optical properties and having low abrasivity.

RELATED ART

In Matsumoto et al, "Method for the Production of Antifog Polyolefin Film" Japanese Kokai No. 60 (1985) - 49,047, there is disclosed a method of using a polyolefin resin composition containing polyolefin resin, two types of finely powdered inorganic filler, an unsaturated fatty acid amide and a mixed fatty acid polyolester.

In Hayashida et al, "Polyolefin Resin Composition", U.S. Pat. No. 5,346,944 there is disclosed a polyolefin resin composition having an antiblocking agent and, optionally, an antistatic agent, an antifogging agent and antioxidants.

DESCRIPTION OF EMBODIMENTS OF THE INVENTION

One embodiment of the present invention is a mixture of a first component selected from talcs and a second component selected from feldspars and nepheline syenites, wherein the ratio of the first component to the second component provides an abrasiveness property significantly less than that expected from the law of mixtures.

Preferably the abrasiveness property is about eighty percent or less of than that expected from the law of mixtures, more preferably is about fifty percent or less of than that expected from the law of mixtures.

This mixture has use as a precursor material useable in polyolefin resin compositions and in films and other types of products, such as sheets, molds and castables, manufactured from such polyolefin resin compositions. Polyolefins considered suitable for the present invention may be any polyolefin, which can be clear, crystalline, and capable of forming a self-supported film. Non-limiting examples include crystalline homopolymers of a-olefin with carbon numbers ranging from 2 to 12 or a blend of two or more crystalline copolymers or ethylene-vinlyacetate copolymers with other resins. Also, the polyolefin resin can be a high-density polyethylene, low-density polyethylene, linear low-density polyethylene, polypropylene, ethylene-propylene copolymers, poly-1-butene, ethylene-vinyl acetate copolymers, etc., and low and medium-density polyethylenes. Additional examples are represented by random or block copolymers of polyethylene, polypropylene poly-r-methylpentene-1, and ethylene-propylene; and ethylene-roprylene-hexane copolymers. Among them, copolymers of ethylene and propylene and those containing 1 or 2 selected from butene-1, hexane-1, 4-methylpentene-1, and octene-1 (the so-called LLDPE) are particularly suitable. The method of producing polyolefin resin used in the present invention is not limited. For example, it can be manufactured by ionic polymerization or radical polymerization. Examples of polyolefin resins obtained by ionic polymerization include homopolymers such as polyethylene, polypropylene, polybutene-1, and poly4-methylpentene and eethylene copolymers obtained by copolymerizing ethylene and a-olefin, a-olefins having from 3 to 18 carbon atoms such as propylene, butene-1,4-methylpentene-1, hexens-l, octene-1, decene-1, and octadecene-1 are used as a-olefins. These a-olefins can be used individually or as two or more types. Other examples include propylene copolymers such as copolymers of propylene and butene-1. Examples of polyolefin resins obtained by radical polymerization include ethylene alone or ethylene copolymers obtained by copolymerizing ethylene and radical polymerizable monomers. Examples of radical polymerizable monomers include unsaturated carboxylic acids such as acrylic acid, methyacrylic acid and maleic acid esters and acid anhydrides thereof and vinyl esters such as vinyl acetate. Concrete examples of esters of unsaturated carboxylic acids include ethyl acrylate, methyl methacrylate and glycidyl methacrylate. These radical polymerizable monomers can be used individually or as two or more types.

The talc in the present invention is selected from those talcs useable for manufactured polyolefin materials. A typical talc is monoclinic in crystal structure, has a specific gravity of about 2.6 to 2.8 and an empirical formula of $Mg_3 Si_4 O_{10} (OH)_2$.

Preferably, the average particle size of the talc used is from about 0.1 microns to about 10 microns.

The second component is selected from feldspars and nepheline syenites, or mixtures thereof Such materials are known to those in the art and are conveniently defined in "Minerals and Rocks", *The New Encyclopedic Britannica*, Vol. 24, pp. 151–157, 175–179, Encyclopedia Britannica, Inc. (Chicago, 1986), incorporated herein by reference in its entirety.

Preferably the average particle size of the second component used is from about 0.1 micron to about 10 microns.

The mixture is made by any convenient mixing operation which does not adversely reduce or agglomerate the component. Such mixing can be, but is not required to be, integrated into the milling operation, if any, of the components.

The abrasiveness property can be determined by using the Einlehner AT 1000 abrasion tester and the recommended methodolgy of the manufacturer, as such equipment and methods are known in the art. Incorporated herein by reference in its entirety is the manual "Einlehner Abrasion Tester AT 1000".

In another embodiment, the present invention is an antiblock agent comprising a mixture of a first component selected from talcs and a second component selected from feldspars and nepheline syenites, wherein the ratio of the first component to the second component provides an antiblocking action significantly greater than either component alone.

In a preferred embodiment, the ratio of the two components is from about 1/3 to about 3/1; that is, about 25 percent to about 75 percent of talc with the balance being the second component. More preferably, the ratio is from about 45/55 to about 75/15.

Preferably, the antiblocking action produces a blocking degree of about eighty-five percent or less than either component alone; more preferably a blocking degree of about seventy-five percent or less than either component alone; and even more preferably a blocking degree of about fifty percent or less than either component alone.

The antiblock agent can be used to produce a polyolefin film and when so used, preferably the mixture of the first component and the second component does not result in a significant loss of optical properties such as clarity and haze.

In another embodiment, the invention is a mixture of a first component selected from talcs and a second component selected from feldspars and nepheline syenites, wherein the ratio of the first component to the second component provides an abrasiveness property significantly less than that expected from the law of mixtures and wherein the ratio of the first component to the second component provides an antiblocking action significantly greater than either component alone.

Preferably, the ratio of the first and second component ranges from about 1/3 to 3/1 and the abrasiveness property of the first and second component in mixture is about fifty percent or less than that expected from the law of mixtures and the antiblocking agent produces a blocking degree of about fifty percent or less.

The mixture of the first and second component can be produced as a precursor mixture added into a polyolefin resin composition or formulated in situ in either a polyolefin resin composition or as a portion of the polyolefin film production. The order of addition of the separate components is not critical. When formulated in situ, the components can be added separately in sequence or simultaneously or into separate master batches to be later blended together.

In yet another embodiment, the invention is a polyolefin resin composition having a mixture of a first component selected from talcs and a second component selected from feldspars and nepheline syenites, wherein the ratio of the first component to the second component provides an abrasiveness property significantly less than that expected from the law of mixtures.

Another embodiment is a polyolefin film comprising the polyolefin resin composition having a ratio of the first component to the second component which provides an abrasiveness property significantly less than that expected from the law of mixtures and further provides an antiblocking action significantly greater than either component alone.

Preferably, the polyolefin resin composition has a mixture of the first and second component wherein the ratio of the first component to second component is from about 1/3 to 3/1 and the abrasiveness property of the first and second component in mixture is about eighty percent or less than that expected from the law of mixtures and the first and second component in combination produces a blocking degree of about fifty percent or less.

In another embodiment, the invention is a polyolefin film comprising a first component selected from talcs and a second component selected from feldspars and nepheline syenites, wherein the ratio of the first component to the second component provides an abrasiveness property significantly less than that expected from the law of mixtures.

Preferably, the polyolefin film comprising a first component selected from talcs and a second component selected from feldspars and nepheline syenites, wherein the ratio of the first component to the second component provides an abrasiveness property significantly less than that expected from the law of mixtures and wherein the ratio of the first component to the second component provides an antiblocking action significantly greater than either component alone.

The present invention is described in the following illustrative examples which are not intended to limit the scope of the invention.

EXAMPLES Examples 1

Laboratory abrasiveness measurements of antiblock agents were conducted using an Einlehner Abrasion Tester. Minerals and combinations thereof were tested for abrasiveness compared to diatomaceous earth as a control. Samples of Talc A (PolyTalc AG609), Talc B (Polybloc), nepheline syenite (Minex 7), and diatomaceous earth (Super Floss) were tested. Samples and blends are described as follows:

Test 1=50/50* Blend of Talc A and Nepheline syenite
Test 2=50/50 Blend of Talc B and Nepheline syenite
Test 3=75/25 Blend of Talc A and Nepheline syenite
Test 4=25/75 Blend of Talc A and Nepheline syenite
Test 5=100% Talc A
Test 6=100% Nepheline syenite
Test 7=100% diatomaceous earth

* "50/50" means 50 weight percent to 50 weight percent.

All samples were tested on the Einlehner Model AT-1000 Tester as 10% dry minerals solids slurries. The wear body was a bronze wire screen. Test duration was 100 minutes and/or 174,000 abrasion cycles. The test result represents the weight loss of the wire expressed in milligrams(mgs). Results are provided in Table 1.

TABLE 1

| Test # | Antiblock Mineral(s) | Einlehner Abrasion (mg) |
|---|---|---|
| 1 | 50/50 Blend of Talc A and Nepheline syenite | 24 |
| 2 | 50/50 Blend of Talc B and Nepheline syenite | 26 |
| 3 | 75/25 Blend of Talc A and Nepheline syenite | 14 |
| 4 | 25/75 Blend of Talc A and Nepheline syenite | 49 |
| 5 | 100% Talc A | 1.3 |
| 6 | 100% Nepheline syenite | 131 |
| 7 | 100% diatomaceous earth | 144 |

Example 2

In this experiment, talc and nepheline syenite minerals, alone and in combinations, along with diatomaceous earth as a control were compounded into LDPE (low density polyethylene) resin using a Leistritz twin screw extruder at a total loading of 50% to produce antiblock master batches. The ratio of talc to nepheline syenite was varied from 0/100 to 100/0. The master batches were then let down (mixed) with LDPE and an erucamide slip masterbatch and blown into one millimeter thick film using a single screw blown film line so as to yield a final film formulation of 2000 ppm (parts per million) total mineral antiblock and 750 ppm erucamide slip agent. The film products were then tested for blocking degree and optical properties (haze and clarity) using the following procedures. Test Procedures:

(1) Blocking Degree

The parallel plate method of ASTM D3354-74 was used to measure degree of blocking. In preparing the samples, 8"×8" pieces were cut from the layflat tubing. The double film layer was separated, passed slowly over a grounded bar to remove static charges, and then reunited so that the inside surfaces of the original bubble were in contact with each other. All films were conditioned under a top load of 1.0 psi for 24 hours using a recirculating forced air oven set at 40° C. The force required to separate these two layers was then determined and expressed as grams.

(2) Haze

This test was conducted according to ASTM D 1003. Haze is the percentage of transmitted light which in passing through the film specimen, is scattered. The lower the haze number, the better the light-transmitting film optical property.

(3) Clarity

A Zebedee CL-100 clarity meter was used for this test and operated in accordance with the manufacturers procedure. Optical clarity is defined as the distinctness of detail that an object can be seen through a film. The higher the clarity number, the better the object resolution of the film. Specific antiblocking minerals used for these samples were: Talc A (PolyTalc AG609),; Talc bloc), nepheline syenite (Minex 7), and diatomaceous earth (Super Floss). Results of blocking haze and clarity for the samples of Example 2 are in Table 2.

TABLE 2

Formulation: 2000 ppm Antiblock and 750 ppm Slip in LDPE Film

| Sample # | Antiblock Agent @ 2000 ppm | Blocking Degree | Haze | Clarity |
|---|---|---|---|---|
| 1 | 50/50 Blend of Talc A and Nepheline syenite | 33.9 | 5.5 | 51 |

TABLE 2-continued

Formulation: 2000 ppm Antiblock and 750 ppm Slip in LDPE Film

| Sample # | Antiblock Agent @ 2000 ppm | Blocking Degree | Haze | Clarity |
|---|---|---|---|---|
| 2 | 50/50 Blend of Talc B and Nepheline syenite | 34.1 | 5.6 | 47 |
| 3 | 75/25 Blend of Talc A and Nepheline syenite | 35.5 | 5.5 | 55 |
| 4 | 25/75 Blend of Talc A and Nepheline syenite | 31.5 | 5.4 | 51 |
| 5 | 100% Talc A | 42.7 | 5.8 | 57 |
| 6 | 100% Nepheline syenite | 43.5 | 4.9 | 50 |
| 7 | 100% Diatomaceous earth | 35.6 | 5.6 | 33 |

Example 3

In this additional experiment, the antiblock master batches described in Example 2 were let down with LDPE resin and blown into one millimeter thick film using a single screw blown film line so as to yield a final film formulation of 5500 ppm total mineral antiblock. The film products were then tested for blocking degree and optical properties (haze and clarity) using the same test methods as described in Example 2. Results of blocking degree, haze and clarity for the samples of Example 3 are in Table 3.

TABLE 3

Formulation: 5500 ppm Antiblock and No Slip in LDPE Film

| Sample # | Antiblock Agent @ 5500 ppm | Blocking Degree | Haze | Clarity |
|---|---|---|---|---|
| 1 | 50/50 Blend of Talc A and Nepheline syenite | 32 | 7.3 | 38 |
| 2 | 100% Talc A | 56 | 8.4 | 47 |
| 3 | 100% Nepheline syenite | 58 | 6.5 | 28 |
| 4 | 100% Diatomaceous earth | 39 | 8.8 | 10 |
| 5 | 100% Talc C[1] | 39 | 8.2 | 29 |

[1]Talc C is ABT 2500 talc.

What is claimed is:

1. A mixture consisting essentially of a first component selected from talcs and a second component selected from feldspars and nepheline syenites, wherein the ratio of the first component to the second component provides an abrasiveness property significantly less than that expected from the law of mixtures.

2. The mixture of claim 1 wherein the abrasiveness property is about eighty percent or less of than that expected from the law of mixtures.

3. The mixture of claim 1 wherein the abrasiveness property is about fifty percent or less of than that expected from the law of mixtures.

4. An antiblock agent comprising a mixture consisting essentially of a first component selected from talcs and a second component selected from feldspars and nepheline syenites, wherein the ratio of the first component to the second component provides an antiblocking action significantly greater than either component alone.

5. The agent of claim 4 wherein the ratio is from about 1/3 to about 3/1.

6. The agent of claim 5 wherein the ratio is from about 45/55 to about 75/25.

7. The agent of claim 4 wherein the antiblocking action produces a blocking degree of about eighty-five percent or less than either component alone.

8. The agent of claim 7 wherein the antiblocking action produces a blocking degree of about seventy-five percent or less than either component alone.

9. The agent of claim 8 wherein the antiblocking action produces a blocking degree of about fifty percent or less than either component alone.

10. The agent of claim 4 wherein the mixture of the first component and the second component does not result in a significant loss of optical properties when used in a polyolefin film.

11. A mixture consisting essentially of a first component selected from talcs and a second component selected from feldspars and nepheline syenites, wherein the ratio of the first component to the second component provides an abrasiveness property significantly less than that expected from the law of mixtures and wherein the ratio of the first component to the second component provides an antiblocking action significantly greater than either component alone.

12. The mixture of claim 11 wherein the ratio of the first and second component ranges from about 1/3 to 3/1 and the abrasiveness property of the first and second component in mixture is about eighty percent or less than that expected from the law of mixtures and the antiblocking agent produces a blocking degree of about fifty percent or less.

13. A polyolefin resin composition comprising of a precursor mixture consisting essentially of a first component selected from talcs and a second component selected from feldspars and nepheline syenites, wherein the ratio of the first component to the second component provides an abrasiveness property significantly less than that expected from the law of mixtures.

14. The polyolefin resin composition of claim 13 wherein the ratio of the first component to the second component further provides an antiblocking action significantly greater than either component alone.

15. The polyolefin resin composition of claim 14 wherein the ratio of the first component to second component is from about 1/3 to 3/1 and the abrasiveness property of the first and second component in mixture is about eighty percent or less than that expected from the law of mixtures and the first and second component in combination produces a blocking degree of about fifty percent or less.

16. A polyolefin film comprising the polyolefin resin composition of claim 13.

17. A polyolefin film comprising the polyolefin resin composition of claim 14.

18. A polyolefin film comprising a polyolefin resin composition comprising a mixture consisting essentially of a first component selected from talcs and a second component selected from feldspars and nepheline syenites, wherein the ratio of the first component to the second component provides an abrasiveness property significantly less than that expected from the law of mixtures.

19. A polyolefin film comprising a polyolefin resin composition comprising a mixture consisting essentially of a first component selected from talcs and a second component selected from feldspars and nepheline syenites, wherein the ratio of the first component to the second component provides an abrasiveness property significantly less than that expected from the law of mixtures and wherein the ratio of the first component to the second component provides an antiblocking action significantly greater than either component alone.

* * * * *